(12) United States Patent
Harita et al.

(10) Patent No.: US 7,836,541 B2
(45) Date of Patent: Nov. 23, 2010

(54) WIPER BLADE AND VEHICLE WIPER DEVICE

(75) Inventors: Yasuhiro Harita, Kosai (JP); Yoshito Hirota, Iwata (JP)

(73) Assignee: Asmo Co., Ltd., Kosai-shi, Shizuoka-ken (JP)

( * ) Notice: Subject to any disclaimer, the term of this patent is extended or adjusted under 35 U.S.C. 154(b) by 1065 days.

(21) Appl. No.: 11/585,341

(22) Filed: Oct. 24, 2006

(65) Prior Publication Data

US 2007/0089257 A1 Apr. 26, 2007

(30) Foreign Application Priority Data

Jul. 22, 2005 (JP) ............................. 2005-213164
Oct. 24, 2005 (JP) ............................. 2005-308865

(51) Int. Cl.
*B60S 1/52* (2006.01)
*B60S 1/38* (2006.01)

(52) U.S. Cl. ............................. 15/250.04; 15/250.201; 15/250.32

(58) Field of Classification Search ............. 15/250.04, 15/250.32, 250.201, 250.02, 250.01, 250.361; 239/284.1, 284.2

See application file for complete search history.

(56) References Cited

U.S. PATENT DOCUMENTS

| 4,342,126 | A | * | 8/1982 | Neefeldt | 15/246 |
| 5,016,312 | A | * | 5/1991 | Frimley | 15/250.04 |
| 5,245,720 | A | | 9/1993 | Schon | |
| 5,383,602 | A | | 1/1995 | Edele et al. | |
| 5,636,794 | A | * | 6/1997 | Hess et al. | 239/284.1 |
| 5,987,695 | A | * | 11/1999 | Edele et al. | 15/250.04 |
| 6,393,652 | B1 | * | 5/2002 | Vogt | 15/250.04 |

FOREIGN PATENT DOCUMENTS

| EP | 1 099 609 | 5/2001 |
| JP | 54-180541 | 12/1979 |
| JP | 2-132566 | 11/1990 |
| JP | 04-108470 | * 9/1992 |

* cited by examiner

*Primary Examiner*—Gary K Graham
(74) *Attorney, Agent, or Firm*—Pearl Cohen Zedek Latzer, LLP

(57) ABSTRACT

A lever of a wiper blade holds a blade rubber. A cover accommodates at least a part of the lever from an opening. A nozzle mechanism has a connecting portion connected to a supply passage. A nozzle portion receives washer liquid that has been sent from the supply passage under pressure and passed the connecting portion, and supplies the washer liquid to a surface to be wiped. An attachment member is integrated with the nozzle mechanism. In a state where the cover accommodates the nozzle mechanism, the attachment member is attached to the lever or the cover. Therefore, the wiper blade is capable of stably supplies washer liquid to the surface to be wiped for an extended period of time.

11 Claims, 18 Drawing Sheets

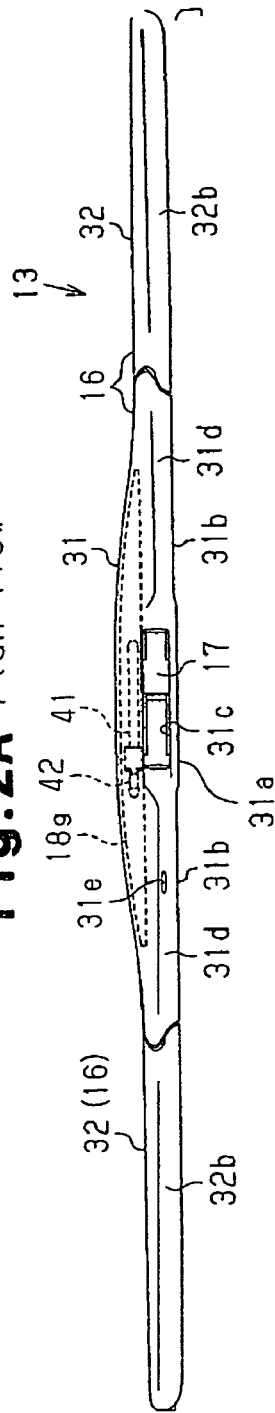
Fig. 2A Plan View
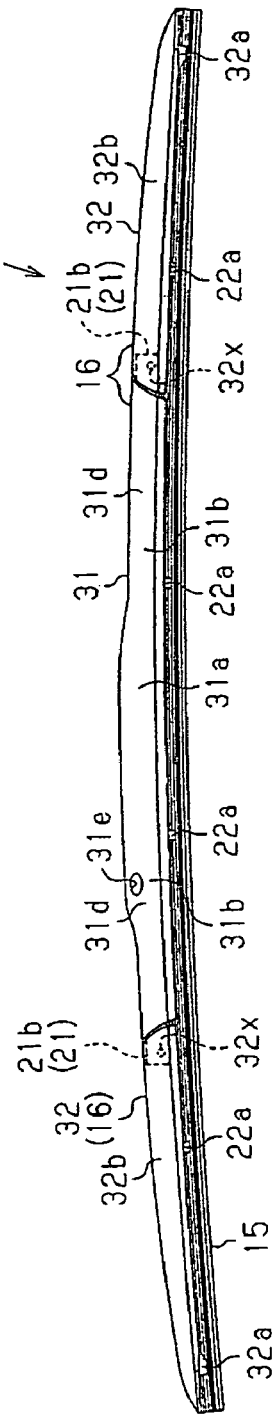
Fig. 2B Vehicle Forward Side
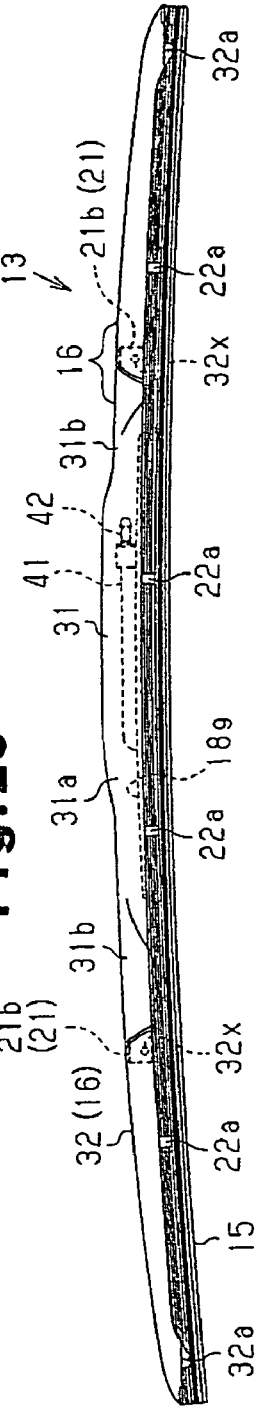
Fig. 2C Vehicle Rearward Side

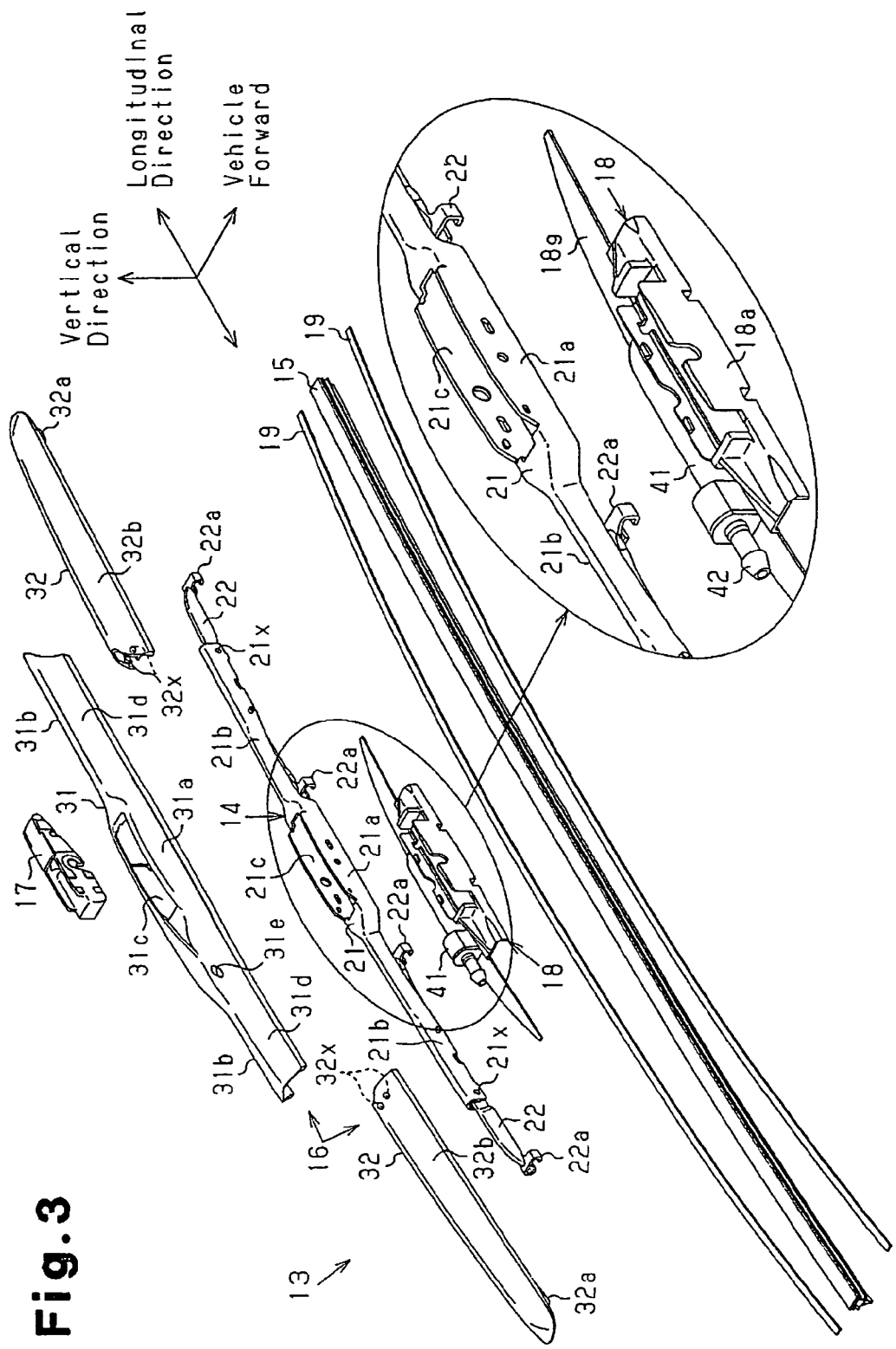

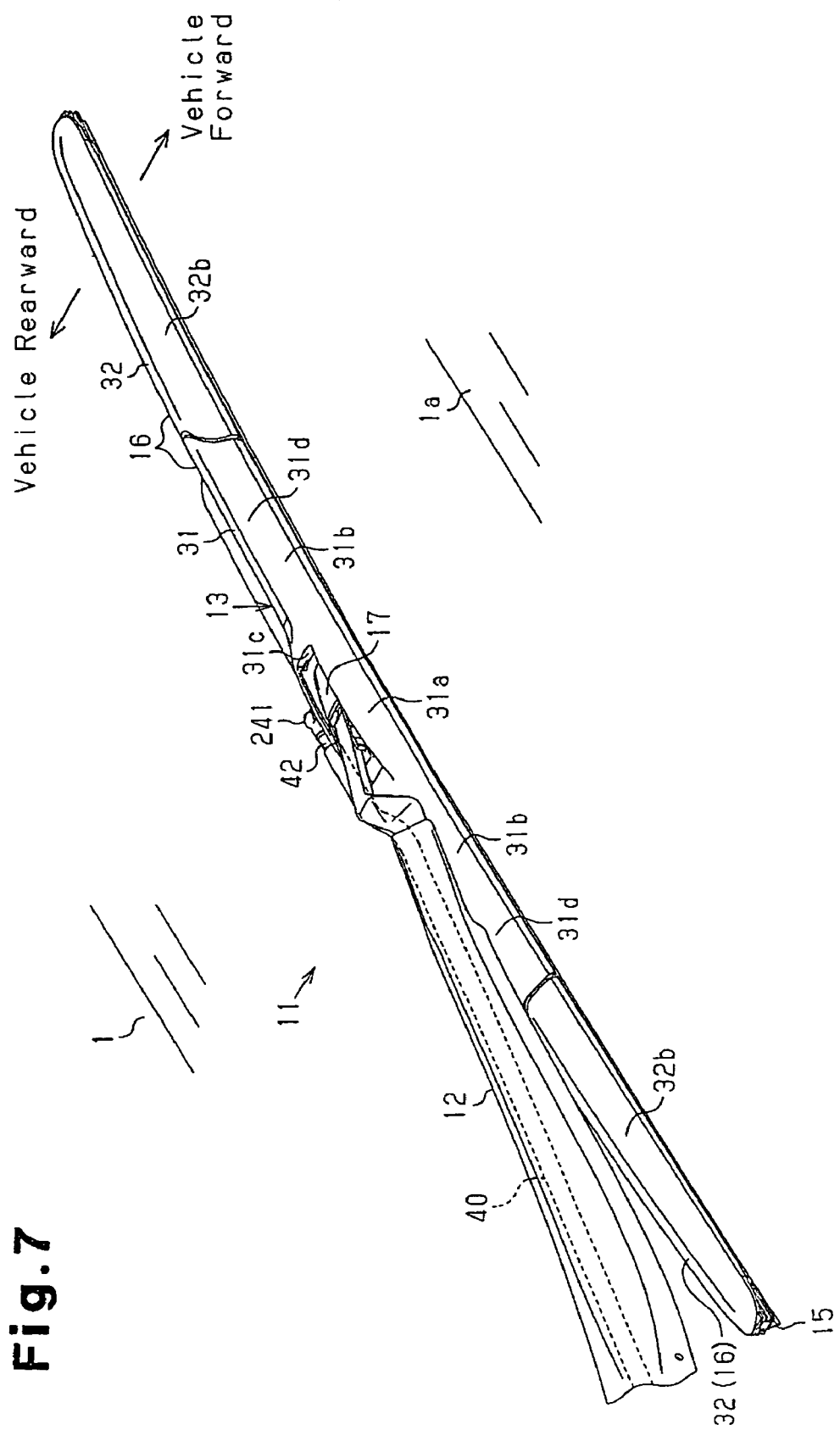

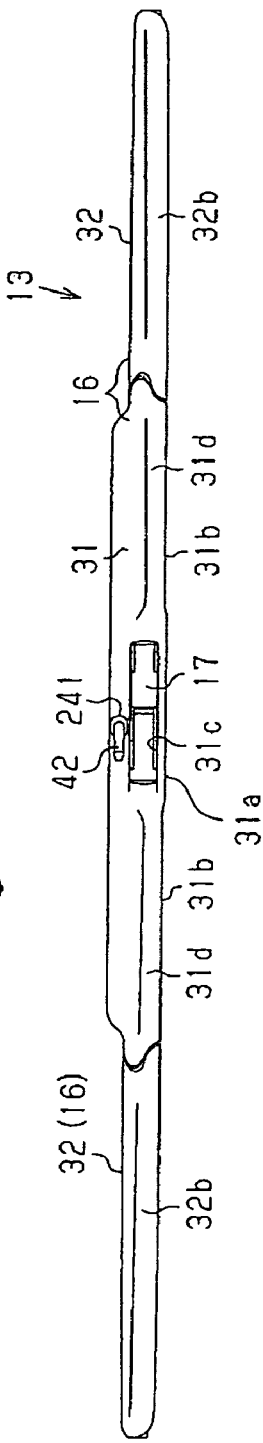
Fig. 8A Plan View
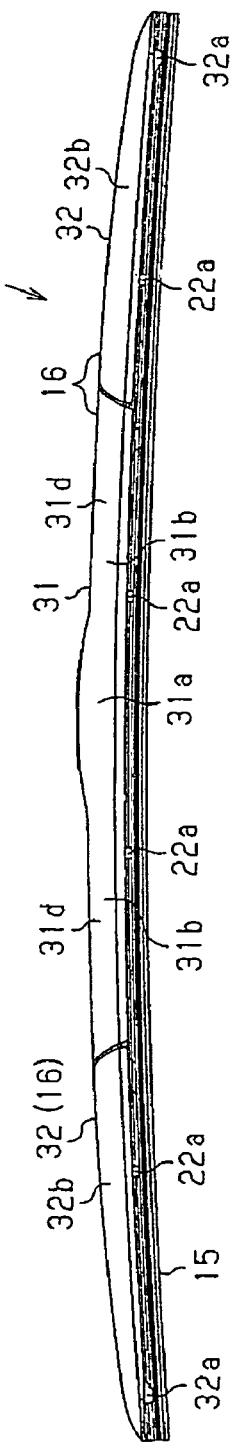
Fig. 8B Vehicle Forward Side
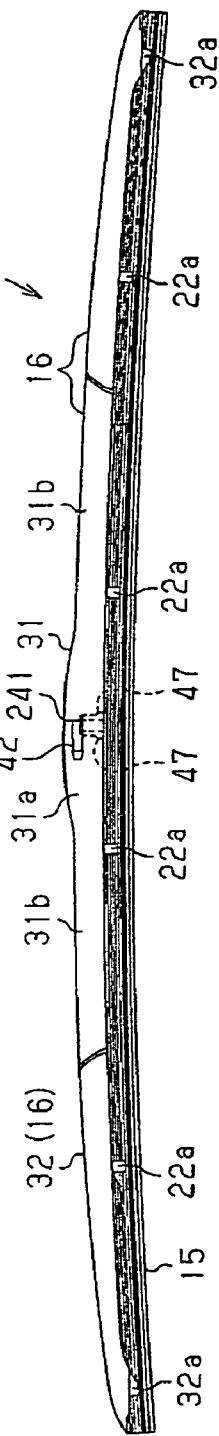
Fig. 8C Vehicle Rearward Side ← Vehicle Rearward     Vehicle Forward →

WIPER BLADE AND VEHICLE WIPER DEVICE

CROSS-REFERENCE TO RELATED APPLICATIONS

This application claims priority from Japanese application 2005-308865, filed on Oct. 24, 2005, incorporated by reference herein in its entirety.

FIELD OF THE INVENTION

The present invention relates to a wiper blade and a vehicle wiper device provided with a function for supplying washer liquid to a surface to be wiped of vehicle window glass.

BACKGROUND OF THE INVENTION

Typically, when a wiper blade wipes to wipe dirt from a vehicle window glass, a washing device supplies washer liquid to the surface to be wiped. For example, Japanese Laid-Open Utility Model Publication No. 54-180541 discloses a pipe having a rigidity that properly supplies washer liquid to a surface to be wiped. The rigid pipe attached to an wiper arm to extend along a wiper blade at an outer side of the wiper blade. The rigid pipe has a number of spray holes for spraying washer liquid to the surface to be wiped at close range.

However, in the above configuration, the rigid pipe with the spray holes are exposed to the outside of the wiper blade. Such piping spoils the appearance of the vehicle. Further, direct sunlight accelerates degradation of the pipe, and the spray holes can be blocked by snow, dust, or bird dropping. That is, there has been a demand for a structure that is capable of spraying (supplying) washer liquid to a surface to be wiped over an extended period of time.

Japanese Laid-Open Utility Model Publication No. 2-132566 discloses a wiper device in which washer nozzles are attached to a wiper blade and a wiper arm, so that washer liquid is reliably supplied to a surface to be wiped. The washer liquid is thus sprayed onto the surface to be wiped at close range. To supply washer liquid from a tank to the washer nozzles, hoses extend along the wiper blades and wiper arms.

However, in the prior art wiper devices, residual washer liquid in the hoses can leak from the wash nozzles in a standby state, where no washer liquid should be supplied to the surface to be wiped. Particularly, in the wiper device of Japanese Laid-Open Utility Model Publication No. 2-132566, the washer nozzles are attached to reciprocating members, or the wiper blades and wiper arms. In such a case, residual washer liquid in the hoses receives centrifugal force generated by pivoting motion of the wiper blades and wiper arms and concentrate at the washer nozzle. This is likely to cause the liquid to leak from the nozzles.

Washer liquid that has leaked from the washer nozzles can collect on the surface to be wiped prior to the wiping operation of the wiper blade. In this case, no problem is caused since the wiper blade wipes the leaked washer liquid right away. However, washer liquid that has leaked during a reverse motion of the wiper blade collects on a surface to be wiped immediately after the wiper blade has wiped that surface. Therefore, until the wiper blade wipes the surface in the subsequent cycle, the leaked washer liquid remains on the surface to be wiped, which can disturb the driver's view.

Also, if washer liquid leaks from the washer nozzles, the amount of washer liquid in the hoses is decreased. Therefore, in the subsequent spraying of the washer liquid, the spraying is not started until the hoses are filled with washer liquid. Accordingly, the responsiveness of the device is degraded. That is, the time from when the operation for supplying the washer liquid is performed to when the washer liquid is actually sprayed is extended.

SUMMARY OF THE INVENTION

Accordingly, it is an objective of the present invention to provide a wiper blade that is capable of stably supplies washer liquid to a surface to be wiped for an extended period of time.

Another objective of the present invention is to provide a wiper blade and a wiper device that are capable of supplying washer liquid to a surface to be wiped, prevents leakage of the washer liquid during a non-supplying period, and maintains a favorable driver's view.

According to an aspect of the invention, a wiper blade attachable to a wiper arm is provided. The wiper arm is provided with a supply passage of washer liquid. The wiper blade includes a blade rubber for wiping a surface to be wiped; and a lever coupled to a wiper arm. The lever holds the blade rubber. A cover has an opening facing the blade rubber. The cover accommodates at least a part of the lever from the opening. A nozzle mechanism has a connecting portion connected to the supply passage and a nozzle portion. The nozzle portion receives washer liquid that has been sent from the supply passage under pressure and passed the connecting portion, and supplies the washer liquid to the surface to be wiped. An attachment member is integrated with the nozzle mechanism. In a state where the cover accommodates the nozzle mechanism, the attachment member is attached to the lever or the cover.

According to another aspect of the invention, a vehicle wiper device for spraying washer liquid that is fed under pressure from a pump device through a supply passage to a surface to be wiped is provided. The wiper device includes a wiper arm that is rotated in a reciprocating manner in relation to the surface to be wiped. A wiper blade is provided on the wiper arm. The wiper blade includes a holding member coupled to a distal end of the wiper arm, and a long blade rubber held by the holding member. The blade rubber wipes the surface to be wiped. At least one nozzle mechanism is attached to the wiper blade or the wiper arm. The nozzle mechanism includes a connecting portion connected to the supply passage, and a spray hole for spraying the washer liquid supplied from the connecting portion to the surface to be wiped. A water shutoff structure disconnects the spray hole from the connecting portion when the supply of the washer liquid is stopped. The water shutoff structure permits the washer liquid to flow from the connecting portion to the spray hole by means of a supply pressure of the washer liquid generated when the washer liquid is fed under pressure.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2A is a plan view of the wiper blade shown in FIG. 1;

FIG. 2B is a front view of the wiper blade shown in FIG. 2A;

FIG. 2C is a rear view of the wiper blade shown in FIG. 2A;

FIG. 3 is an exploded perspective view of the wiper blade shown in FIG. 2A;

FIG. 7 is a perspective view illustrating a wiper device according to a second embodiment of the present invention;

FIG. 8A is a plan view of the wiper blade with a washer nozzle shown in FIG. 7;

FIG. 8B is a front view of the wiper blade shown in FIG. 8A;

FIG. 8C is a rear view of the wiper blade shown in FIG. 8A;

DETAILED DESCRIPTION OF THE PREFERRED EMBODIMENTS

A first embodiment of the present invention will now be described with reference to FIGS. 1 to 6.

Figure 1:
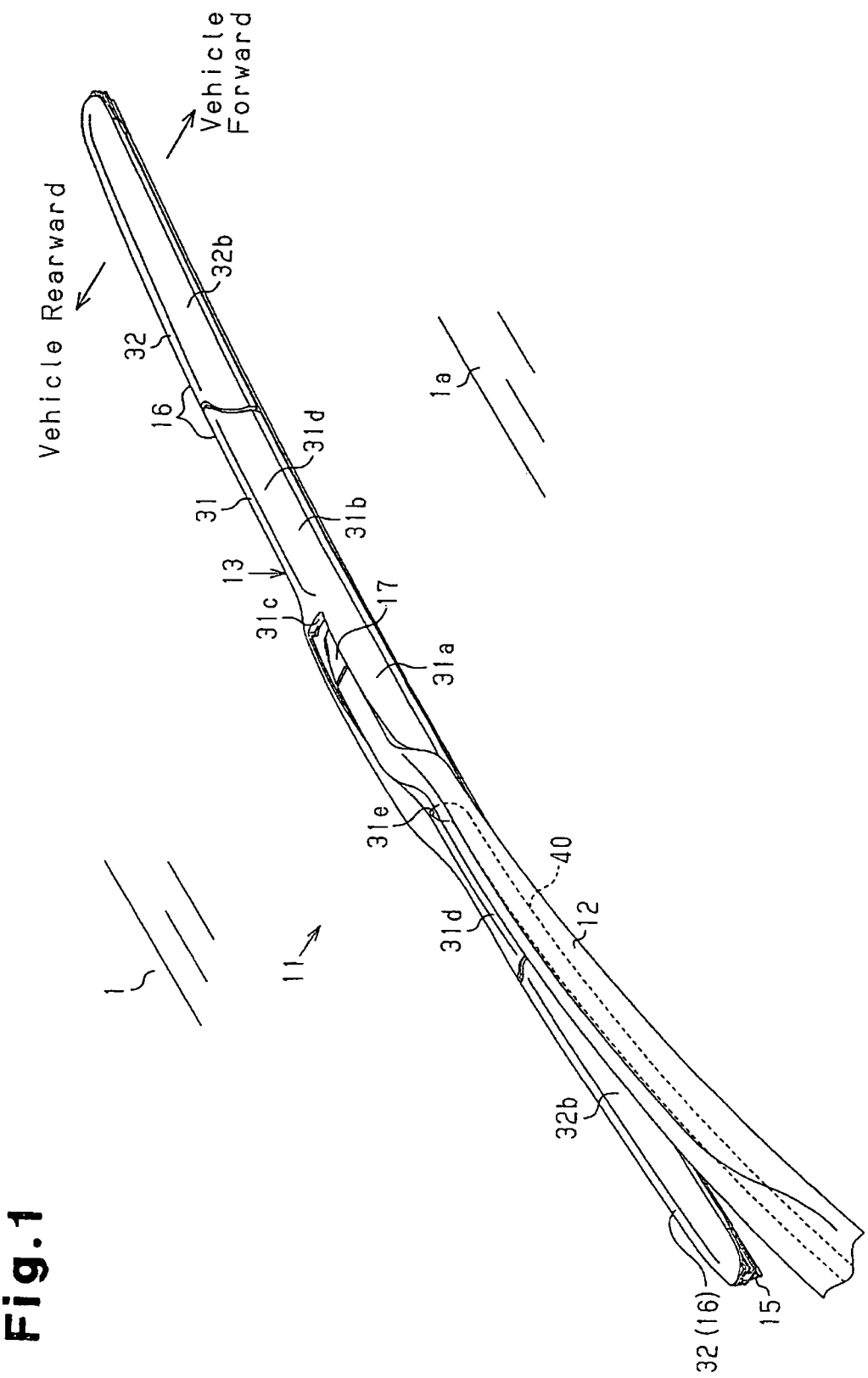
FIG. 1 is a perspective view illustrating a wiper device according to a first embodiment of the present invention.

A vehicle wiper device 11 shown in FIG. 1 wipes dirt and rain droplets from a surface to be wiped 1a of a vehicle windshield 1.

The vehicle wiper device 11 includes a wiper arm 12 and a wiper blade 13. A proximal end of the wiper arm 12 is coupled to a pivot shaft (not shown), which is caused to reciprocate in a predetermined angle range by drive force of a wiper motor (not shown). The wiper blade 13 is coupled to a distal end of the wiper arm 12. The wiper blade 13 is rotatable about a rotation axis that is perpendicular to the longitudinal direction of the wiper arm 12. A spring (not shown) for urging the wiper blade 13 toward the surface to be wiped 1a is attached to the wiper arm 12. As the pivot shaft rotates in a reciprocating manner, the wiper arm 12 is caused to pivot in a reciprocating manner, so that the wiper blade 13 wipes the surface to be wiped 1a.

As shown in FIG. 3, the wiper blade 13 includes a lever assembly 14, a blade rubber 15 attached to the lever assembly 14, a cover mechanism 16 covering the lever assembly 14, a coupling member 17 coupling the lever assembly 14 to the wiper arm 12, an attachment plate 18 attached to the lever assembly 14.

The lever assembly 14, which serves as a lever, includes a primary lever 21 and two secondary levers 22, each coupled to one end of the primary lever 21. The primary lever 21 and the secondary levers 22 are assembled to form a tournament chart-like structure, that is, hierarchical structure. The primary lever 21 and the secondary levers 22 are lever members formed by pressing metal plate material.

The primary lever 21 has a holder portion 21a located at a center and two arm portions 21b extending in the longitudinal direction from the holder portion 21a. The holder portion 21a has a rectangular opening 21c that opens upward. The holder portion 21a includes a pair of parallel sidewalls to define the opening 21c. The opening 21c receives the coupling member 17. The coupling member 17 is rotatably supported in the holder portion 21a. The distal end of the wiper arm 12 is detachably connected to the coupling member 17. That is, the distal end of the wiper arm 12 is inserted into the opening 21c. The primary lever 21 is rotatable relative to the wiper arm 12 about a rotation axis that extends in a direction perpendicular to the longitudinal direction of the wiper arm 12.

As viewed in a direction perpendicular to the longitudinal direction, or in a lateral cross-sectional view, each arm portion 21b has an inverted U-shape opened to the surface to be wiped 1a. That is, each arm portion 21b has a mountain-folded shape.

Like the arm portions 21b of the primary lever 21, the secondary levers 22 each have an inverted U-shaped cross-section opened to the surface to be wiped 1a. A central portion of each secondary lever 22 is rotatably coupled to each end of the primary lever 21, or to the distal end of each arm portion 21b. Each secondary lever 22 is rotatable relative to the primary lever 21 about a rotation axis that extends in a direction perpendicular to the longitudinal direction of the primary lever 21.

A holding portion 22a for holding the blade rubber 15 is formed at each end of each secondary lever 22. Each holding portion 22a is shaped like a channel with an opening toward the surface to be wiped 1a, and has hook shaped distal ends that are bent inward. The lever assembly 14 has four holding portions 22a for holding the blade rubber 15 at positions spaced at predetermined intervals along the longitudinal direction.

The blade rubber 15 for wiping the surface to be wiped 1a has an elongated shape. A pair of elongated backings 19 are attached to the blade rubber 15 along the longitudinal direction of the blade rubber 15. The backings 19 disperse, along the longitudinal direction, pressing force that is applied to the blade rubber 15 from the holding portions 22a to urge the blade rubber 15 toward the surface to be wiped 1a. In order that the blade rubber 15 reliably follows the surface to be wiped 1a, the backings 19 has a curved shape to correspond to the curved shape of the surface to be wiped 1a. Each backing 19 has different radii of curvature at different sections so that the radii of curvature changes along the longitudinal direction.

As shown in FIGS. 1 to 3, the cover mechanism 16, which functions as a cover, covers the lever assembly 14 and the blade rubber 15 over the entire length. The cover mechanism 16 includes a center cover 31 and two side covers 32, each located on a side of the center cover 31. The center cover 31 and the side covers 32 are made of a resin material and have a predetermined rigidity.

The center cover 31 serving as a fixed cover is attached to and covers the primary lever 21. The center cover 31 has a holder accommodating portion 31a at a center and a pair of arm accommodating portions 31b extending in the longitudinal direction from the ends of the holder accommodating portion 31a. The holder accommodating portion 31a accommodates the holder portion 21a of the primary lever 21. The holder accommodating portion 31a has an opening 31c that corresponds to the opening 21c of the holder portion 21a. The opening 31c receives the distal end of the wiper arm 12. As viewed in a direction perpendicular to the longitudinal direction, or in a lateral cross-sectional view, each arm accommodating portion 31b has an inverted U-shape opened to the surface to be wiped 1a.

The proximal end of each side cover 32, which serves as a movable cover, is rotatably supported by an end of the primary lever 21, or by the distal end of the corresponding arm portion 21b. A coupler pins 32x are provided the inner side of the proximal end of each side cover 32. Coupler holes 21x are formed in each end of the primary lever 21. The coupler pins 32x are received by the coupler holes 21x, so that the side covers 32 are rotatable relative to the primary lever 21. As the arm accommodating portions 31b of the center cover 31, each side cover 32 has an inverted U-shaped cross-section. The apex of each side cover 32 becomes lower from the proximal end toward the distal end. The rotary shaft 32x may rotatably support the movable cover 32 on the fixed cover 31.

Each side cover 32 covers the corresponding secondary lever 22, and a portion of the blade rubber 15 that extends from the secondary lever 22. A holding portion 32a is formed at the distal end of each side covers 32 to hold the corresponding distal end of the blade rubber 15. The holding portions 32a are similar to the holding portions of the secondary levers 22. Each side cover 32 is rotatable about the corresponding coupler pins 32x, which extend in a direction perpendicular to the longitudinal direction of the primary lever 21. Therefore, when a portion of the blade rubber 15 that extends further from the distal end of one of the secondary lever 22 is bent, the corresponding side cover 32 is rotated to following the bending of the blade rubber 15.

A fin portion 31d is formed in each arm accommodating portion 31b of the center cover 31. The fin portion 31d extends over the entire length of the arm accommodating portion 31b. Likewise, a fin portion 32b is formed in a wall of each side cover 32 that faces forward in the vehicle. The fin portion 32b extends over the entire length of the side cover 32. The fin portions 31d, 32b receive relative wind generated when the vehicle is traveling, so that a force pressing the blade rubber 15 against the surface to be wiped 1a is generated.

As shown in FIGS. 2A and 3, a nozzle mechanism 41 is provided in the center cover 31. The nozzle mechanism 41 is located rearward in the vehicle of the center cover 31, or a side opposite to the fin portion 31d. That is, the nozzle mechanism 41 is located on a leading side of the wiper blade 13 at the beginning of wiping from a standby position. The nozzle mechanism 41 is integrated with the attachment plate 18.

Figure 4:
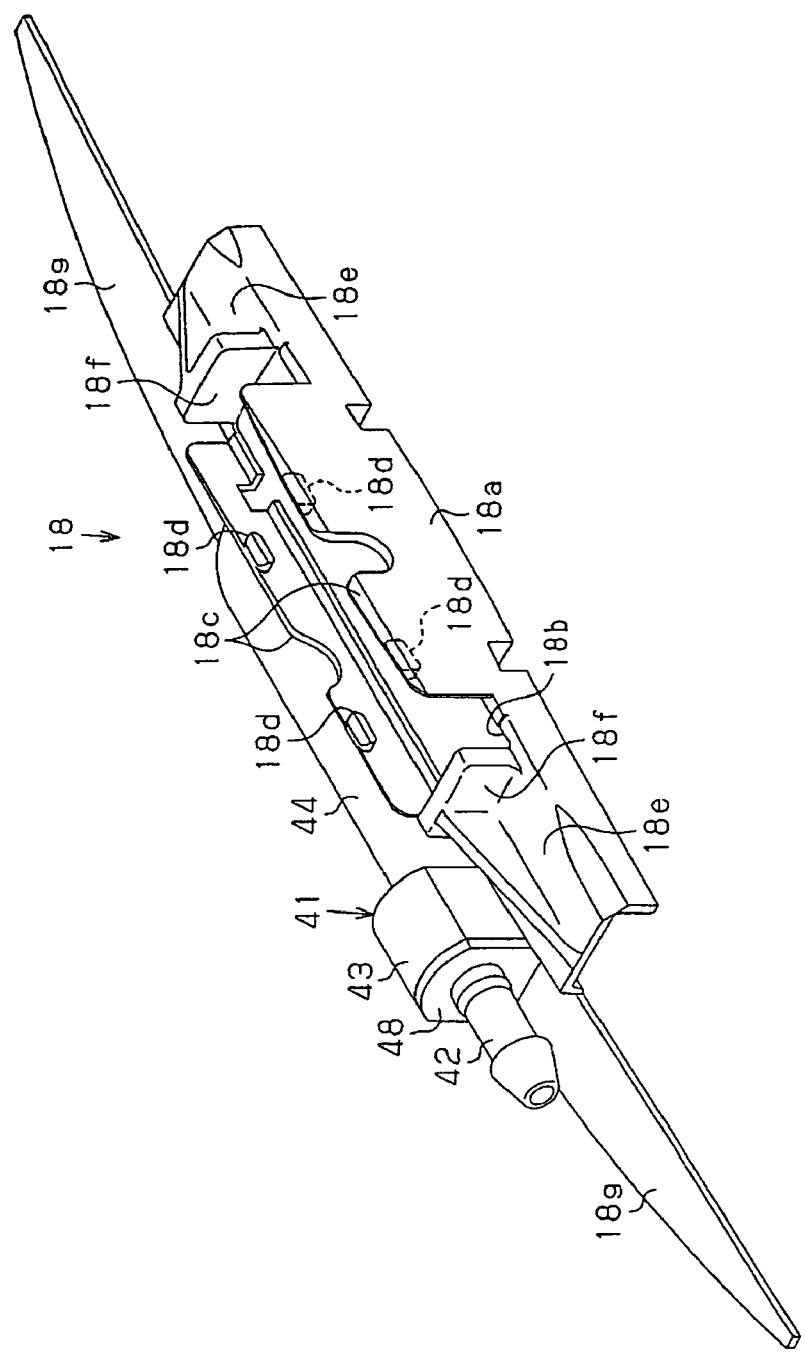
FIG. 4 is a perspective view of the attachment plate with the washer nozzle shown in FIG. 3.

As shown in FIG. 3, the resin attachment plate 18 is attached to the holder portion 21a of the primary lever 21 from below. The longitudinal direction of the attachment plate 18 coincides with the longitudinal direction of the wiper blade 13. As shown in FIG. 4, a plate main body 18a of the attachment plate 18 includes an opening 18b located in a center of the plate main body 18a, and a pair of attaching pieces 18c that define the opening 18b. The opening 18b is rectangular and has a shape corresponding to the opening 21c of the holder portion 21a. The opening 18b extends along the longitudinal direction of the wiper blade 13. The attaching pieces 18c extend along the longitudinal direction of the wiper blade 13, and protrude upward to face the outer surface of the holder portion 21a. Each attaching piece 18c has two engaging projections 18d on the inner side. To detachably couple the attachment plate 18 to the holder portion 21a, the engaging projections 18d are hooked to the upper end of the holder portion 21a.

A pair of first partition walls 18e are located at ends of the opening 18b to close the ends of the lower opening of the holder portion 21a. A second partition wall 18f projects from each first partition wall 18e. The second partition walls 18f are inserted into the holder portion 21a. The first partition walls 18e are flat surfaces that are parallel to the surface to be wiped 1a, and the second partition walls 18f are flat surfaces that are perpendicular to the longitudinal direction of the attachment plate 18.

Figure 6:
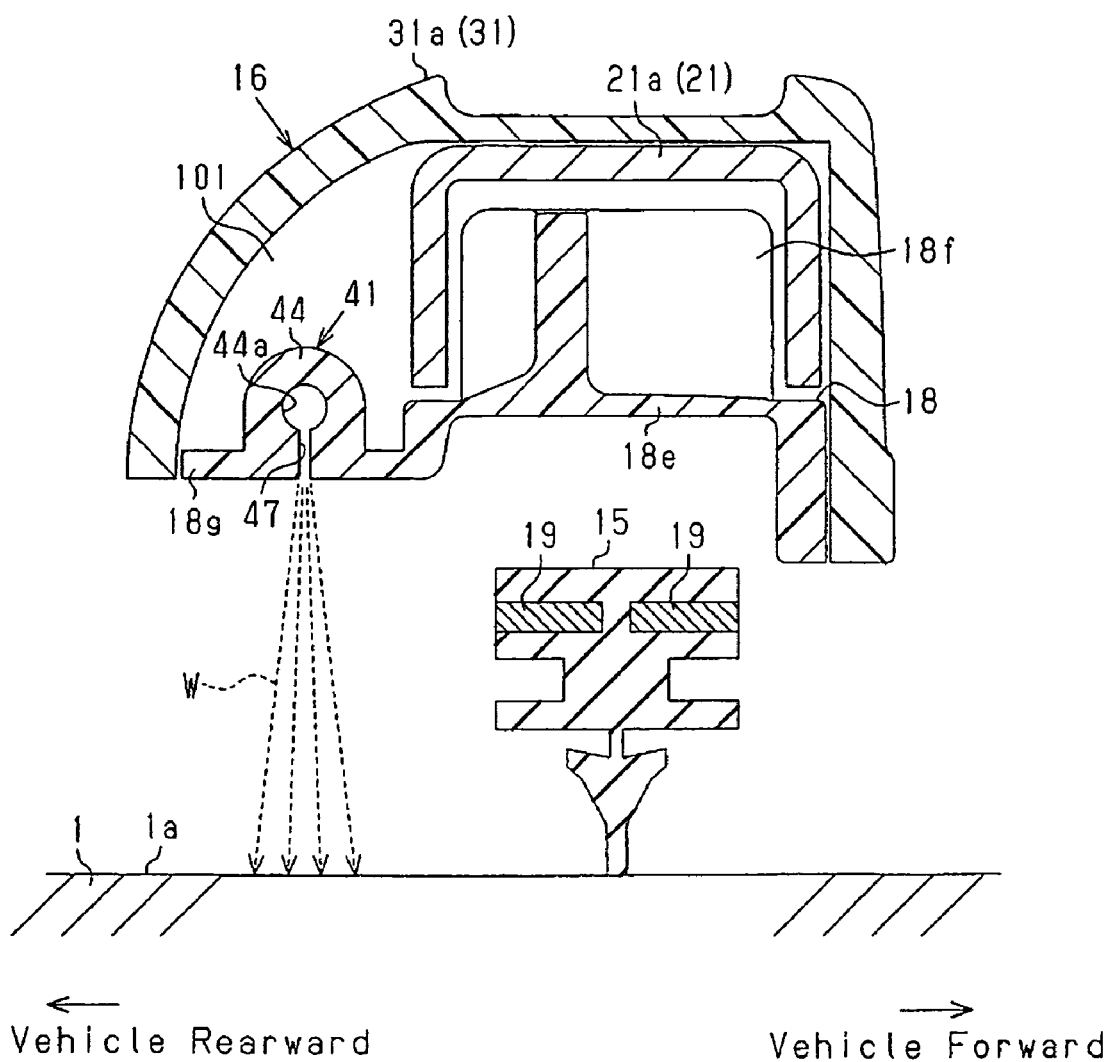
FIG. 6 is a cross-sectional view of the wiper blade shown in FIG. 2A.
Figure 9:
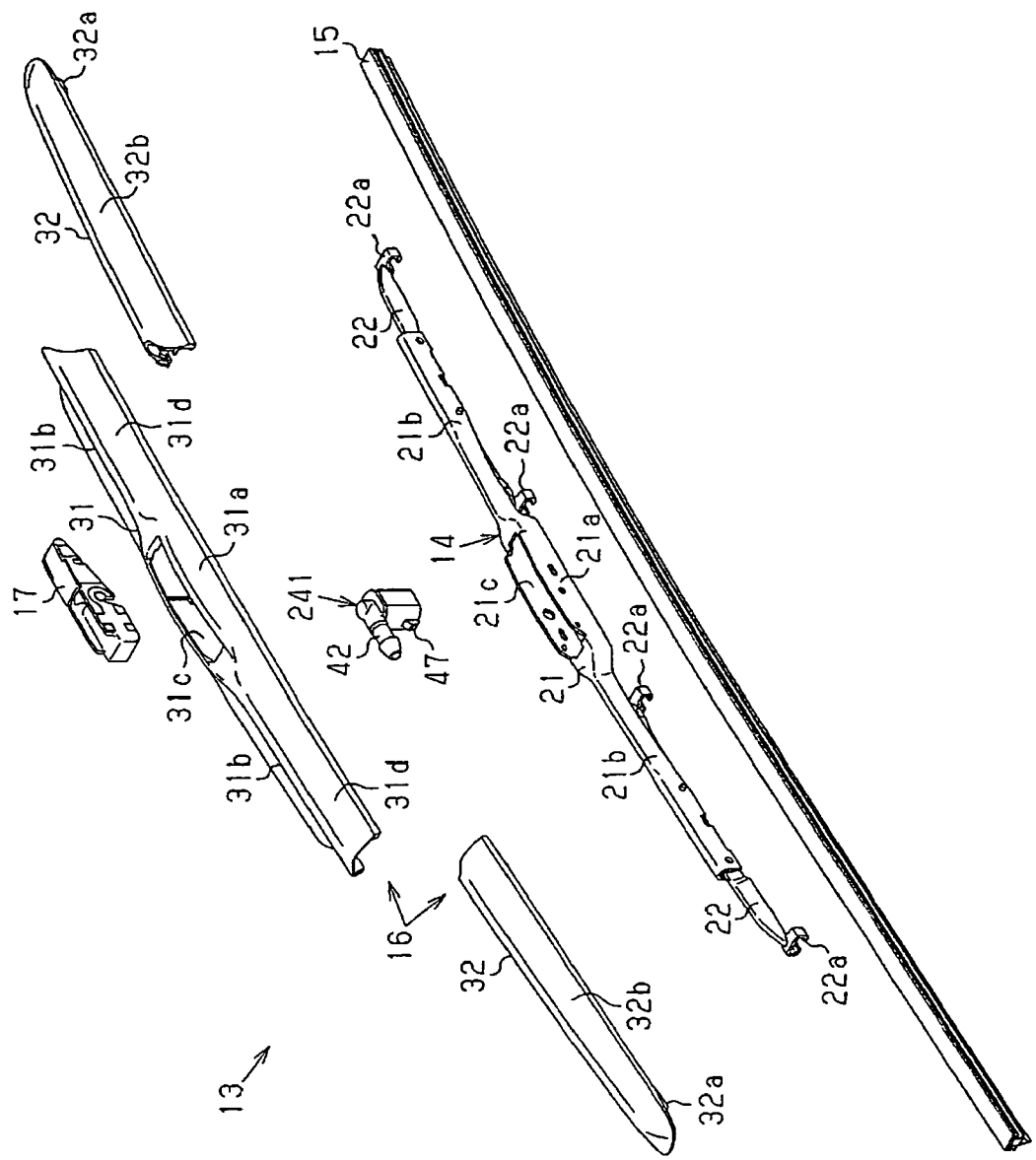
FIG. 9 is an exploded perspective view of the wiper blade shown in FIG. 8A.
Figure 10:
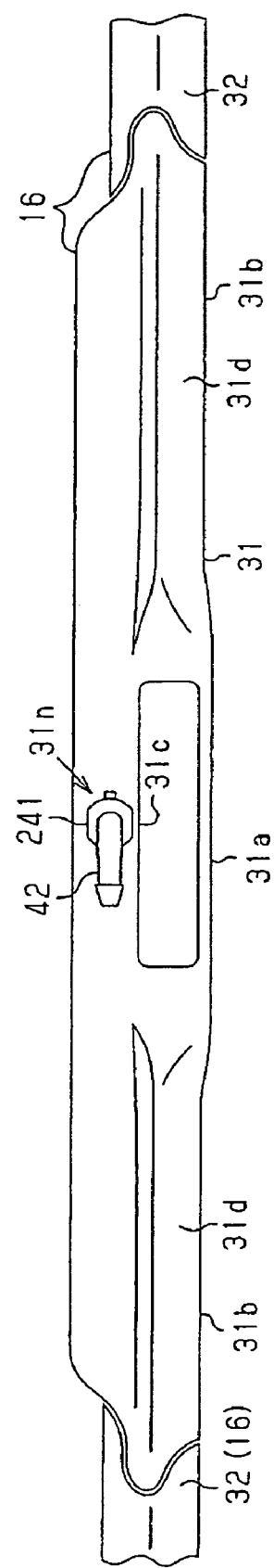
FIG. 10 is an enlarged plan view of the wiper blade shown in FIG. 8A.

The second partition walls 18f divide the inner space of the holder portion 21a into a first space closer to the opening 21c and second spaces closer to the arm portions 21b, that is, at outer sides in the longitudinal direction of the wiper blade 13. As shown in FIG. 6, the first partition walls 18e prevent airflow during driving from entering the first space through the lower opening of the holder portion 21a. The second partition walls 18f prevent airflow that has entered into the first space from entering the second spaces. This smoothes the airflow about the primary lever 21 and thus reduces the wind roar during driving.

As shown in FIG. 6, the plate main body 18a has a first edge that is closer to the fin portion 31d, or located at a side facing forward in the vehicle, and a second edge that is located at a side opposite from the fin portion 31d, or at a side facing rearward in the vehicle. A lid portion 18g is formed at the second edge of the plate main body 18a. An accommodation space 101 is defined between the primary lever 21 and the center cover 31 to accommodate the nozzle mechanism 41. The lid portion 18g closes the lower opening of the accommodation space 101. The lid portion 18g prevents airflow from entering the space accommodating the nozzle mechanism 41, thereby reducing the wind roar during driving.

As shown in FIG. 4, the nozzle mechanism 41 is abreast with the first partition walls 18e along the longitudinal direction of the wiper blade 13, that is, along a direction perpendicular to the longitudinal direction of the attachment plate 18. The nozzle mechanism 41 is integrated with the upper surface of the lid portion 18g. As shown in FIG. 6, the nozzle mechanism 41 is accommodated in the accommodation space 101. The nozzle mechanism 41 receives washer liquid provided from a vehicle-side hose 40 shown in FIG. 1 and sprays the liquid onto the surface to be wiped 1a. The vehicle-side hose 40 may be replaced by a vehicle-side pipe.

Figure 5:
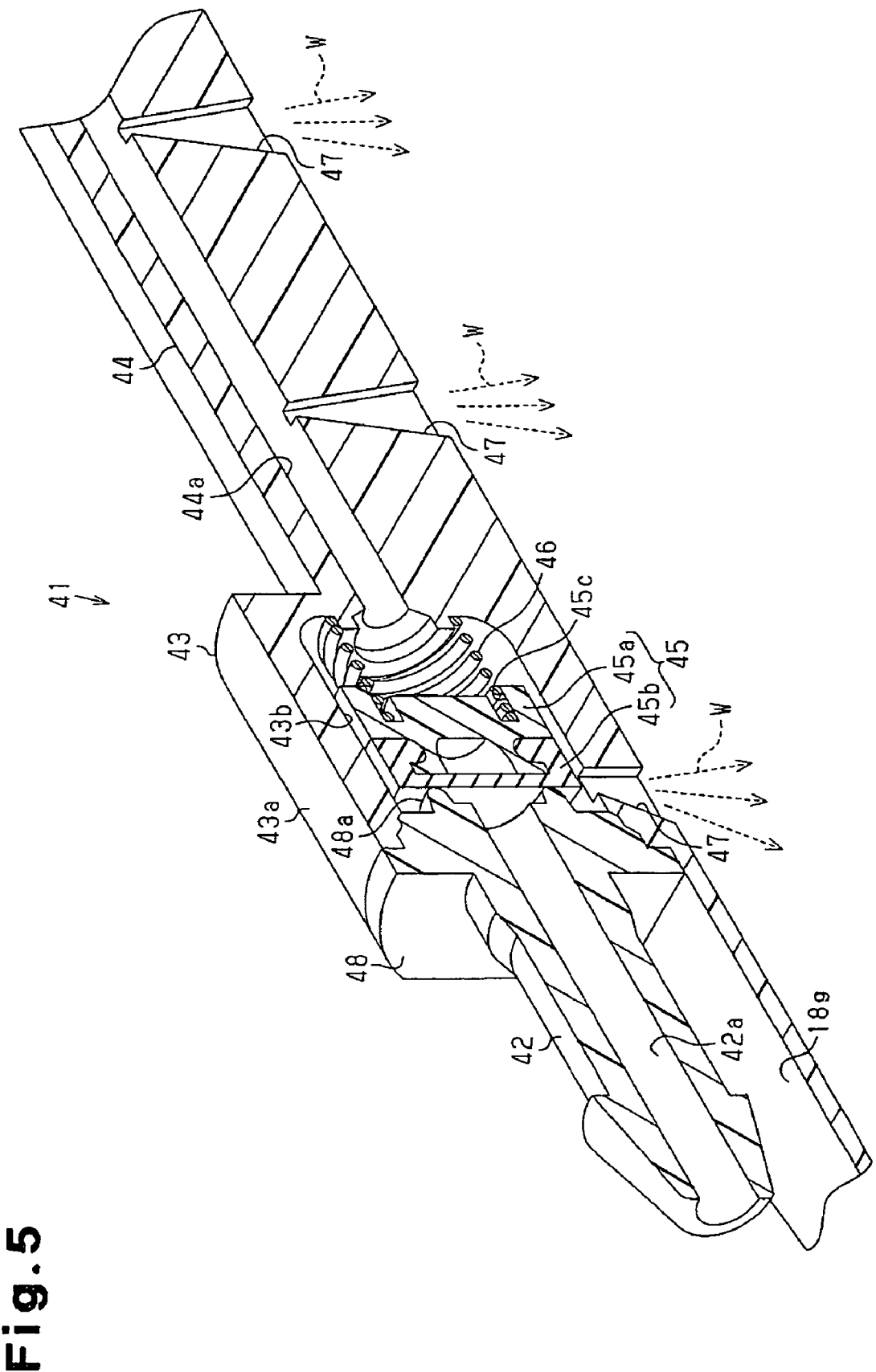
FIG. 5 is a cross-sectional perspective of the washer nozzle shown in FIG. 4.

As shown in FIG. 5, the nozzle mechanism 41 includes a connecting pipe 42 connected to the vehicle-side hose 40, a check valve 43 for closing an inlet passage 42a in the connecting pipe 42 when the washer pump is not operating, and a nozzle portion 44 for spraying the washer liquid toward the surface to be wiped 1a.

As shown in FIG. 5, the check valve 43 includes a valve body 45, a coil spring 46, and a casing 43a. The coil spring 46 urges the valve body 45 in a direction closing the inlet passage 42a, or a valve hole. The casing 43a accommodates the valve body 45 and the coil spring 46. The casing 43a is shaped as a lateral cylinder. An accommodation recess 43b defined in the casing 43a has a circular cross-section. The casing 43a is integrally formed with the upper surface of the lid portion 18g of the attachment plate 18. The bottom of the casing 43a is integrally formed with the nozzle portion 44.

The valve body 45 includes a proximal portion 45a attached to the coil spring 46, and a sealing portion 45b located between the proximal portion 45a and the inlet passage 42a. The cylindrical proximal portion 45a is made of resin, and the disc-shaped sealing portion 45b is made of an elastic material such as rubber and elastomer. The proximal portion 45a has an annular spring seat groove 45c to which an end of the coil spring 46 is attached. The outer diameter of the valve body 45 is less than the inner diameter of the accommodation recess 43b. That is, a gap is defined between the inner circumferential surface of the accommodation recess 43b and the valve body 45. The gap functions as a passage of washer liquid W.

The nozzle portion 44 has a through hole 44a that extends along the longitudinal direction of the wiper blade 13 from the accommodation recess 43b of the check valve 43 to an end opposite to the inlet passage 42a. Spray holes 47 are formed below the through hole 44a and the accommodation recess 43b. In the present embodiment, four spray holes 47 are arranged along the longitudinal direction of the wiper blade 13 at a predetermined interval. FIG. 5 shows three of the spray holes 47. The spray holes 47 spray washer liquid from the through hole 44a and the accommodation recess 43b toward the surface to be wiped 1a.

The accommodation recess 43b of the casing 43a is closed by a lid body 48 having the cylindrical connecting pipe 42.

As shown in FIG. 1, the vehicle-side hose 40 extends along the lower portion of the wiper arm 12 from the washer pump (not shown) on the vehicle to the nozzle mechanism 41. The vehicle-side hose 40 is made of an elastic material such as resin, rubber, and elastomer. The center cover 31 has an insertion hole 31e corresponding to the distal end of the wiper arm 12. The distal end of the vehicle-side hose 40 is inserted into the center cover 31 through the insertion hole 31e, and is connected to the connecting pipe 42 of the nozzle mechanism 41.

As shown in FIG. 5, the lid body 48 has an annular projection 48a provided about the inlet passage 42a. The diameter of the annular projection 48a is smaller than that of the valve body 45.

When the washer pump is not operating, the sealing portion 45b of the valve body 45 is pressed against the annular projection 48a by the force of the coil spring 46. As a result, the valve body 45 closes the inlet passage 42a. Thus, when the washer pump is not operating, the washer liquid W in the inlet passage 42a is prevented from leaking from the spray holes 47 through the accommodation recess 43b.

In contrast, when the washer pump operates and the pressure of the washer liquid W in the inlet passage 42a, or a supply pressure, increases, the valve body 45 moves against the force of the coil spring 46, opening the inlet passage 42a. As a result, the washer liquid W in the inlet passage 42a flows through the accommodation recess 43b and is sprayed from the spray holes 47 onto the surface to be wiped 1a.

When a desired amount of the washer liquid W is sprayed and the washer pump is stopped, the supply pressure of the washer liquid W acting on the valve body 45 is reduced. Therefore, the valve body 45 closes the inlet passage 42a by means of the force of the coil spring 46. Since the sealing portion 45b of the valve body 45 is pressed against the annular projection 48a about the inlet passage 42a, the inlet passage 42a is reliably closed. As a result, the washer liquid W is prevented from flowing into the accommodation recess 43b. That is, the washer liquid W remains in the vehicle-side hose 40 and the inlet passage 42a. The residual washer liquid W is prevented from leaking from the nozzle mechanism 41. Since the coil spring 46 continues to urge the valve body 45 to close the inlet passage 42a, the interior of the vehicle-side hose 40 and the inlet passage 42a keeps being filled with the washer liquid W.

When the vehicle wiper device 11 is not operating, the wiper blade 13 is located at the lower end of the windshield 1. That is, the fin portion 31d, 32b of the cover mechanism 16 are located at the front edge of the wiper blade 13 in the vehicle. The nozzle mechanism 41 is located rearward in the vehicle of the wiper blade 13.

At the beginning of the restart of the operation of the washer pump, the vehicle-side hose 40 and the inlet passage 42a are already filled with the washer liquid W supplied in the previous spraying operation. Thus, at the beginning of the restart of the washer pump, an increase of the supply pressure of the washer liquid W immediately opens the check valve 43. As a result, the washer liquid W in the inlet passage 42a quickly flows through the accommodation recess 43b, and is sprayed from the spray holes 47. In response to the operation of the washer pump, the wiper blade 13 performs wiping operation.

The nozzle mechanism 41 attached to the wiper blade 13 is located in the vicinity of the surface to be wiped 1a at the beginning of the restart of the washer pump. Thus, the washer liquid W is sprayed onto the surface to be wiped 1a at close range. As a result, unintended spraying of the washer liquid W to the outside of the windshield 1 due to relative wind is prevented. That is, the washer liquid is readily supplied to target points.

The washer liquid W is sprayed to positions rearward in the vehicle of the wiper blade 13, that is, to positions located ahead of the blade rubber 15 at the start of wiping. Thus, after being sprayed onto the surface to be wiped 1a, the washer liquid W is immediately wiped away by the blade rubber 15. Thus, the surface to be wiped 1a is quickly cleaned. That is, the blade rubber 15 is prevented from sliding on the surface to be wiped 1a when the surface 1a is dry.

Then number of the spray holes 47 of the nozzle mechanism 41 arranged on the wiper blade 13 may be changed in accordance with the length of the wiper blade 13. For example, the number of the spray holes 47 may increased in accordance with an increase in the length of the wiper blade 13. This enlarges the spraying area of the washer liquid W along the longitudinal direction in accordance with the increased length of the wiper blade 13. Generally, two wiper devices 11 are provided on the windshield 1 of a vehicle. That is, one wiper device 11 is located to correspond to the driver's seat and the other one is located to correspond to the front passenger seat. In this case, one wiper blade 13 of the wiper device 11 at the driver's seat is longer than that of the front passenger seat. The vehicle wiper device 11 of the present embodiment can be applied to this case. An appropriate amount of the washer liquid W for the length of each wiper blade 13 can be supplied to the surface to be wiped 1a of the windshield 1.

The first embodiment provides the following advantages.

(1) The lever assembly 14 of the wiper blade 13 is accommodated in the cover mechanism 16, which improves the appearance. The attachment plate 18, to which the nozzle mechanism 41 is integrated, is attached to the primary lever 21. As a result, the nozzle mechanism 41 is accommodated inside the cover mechanism 16. Thus, the pipes for the washer nozzle are prevented from being prematurely degraded by direct sunlight. The spray holes 47 are prevented from being blocked by snow, dust, or bird dropping on the pipes of the washer nozzle. Accordingly, the washer liquid W is stably supplied to the surface to be wiped 1a for an extended period of time. Protection of the nozzle mechanism 41 from ultraviolet rays contributes to prevention of premature degradation of the nozzle mechanism 41.

(2) The attachment plate 18, which has the nozzle mechanism 41, is detachably connected to the primary lever 21. This facilitates the maintenance of the nozzle mechanism 41. Also, a wiper blade without the nozzle mechanism 41 can be easily obtained by using the cover mechanism 16 and the lever assembly 14 of the present invention and not attaching the attachment plate 18.

(3) The attachment plate 18 has the first partition walls 18e, the second partition walls 18f, and the lid portion 18g to regulate the airflow in the cover mechanism 16 created during driving of the vehicle. The airflow in the cover mechanism 16 is stabilized, and the wind roar caused by the wiper blade 13 is reduced.

The first partition walls 18e and the second partition walls 18f control the air flow in the cover mechanism 16 along the longitudinal direction of the wiper blade 13.

For example, the airflow along the longitudinal direction of the wiper blade 13 moves raindrops along the longitudinal direction of the wiper blade 13, causing the raindrops to collide with the holding portions 22a of the secondary levers 22 holding the blade rubber 15. This can cause a considerable amount of rainwater to gush out of the wiper blade 13. The first partition walls 18e and the second partition walls 18f of the present embodiment prevent rainwater from gushing out of the wiper blade 13, and thus prevent the view of occupants from being degraded. A clear view is thus attained.

(4) The nozzle mechanism 41 is located between the holder portion 21a of the primary lever 21 and the holder accommodating portion 31a of the center cover 31, that is, in the vicinity of the holder portion 21a. This facilitates the handling of the vehicle-side hose 40 for connecting the hose 40 to the nozzle mechanism 41. As a result, the nozzle mechanism 41 is easily connected to the vehicle-side hose 40.

The nozzle mechanism 41 is provided rearward in the vehicle of the blade rubber 15. Therefore, the washer liquid W is supplied to a portion of the surface to be wiped 1a that is about to be wiped by the blade rubber 15 in a manner avoiding interference with the blade rubber 15.

(5) When the wiper blade 13 is at a stopped position, the nozzle mechanism 41 is located on a leading side of the wiper blade 13 at the beginning of wiping. Therefore, the wash liquid W is supplied to a portion of the surface to be wiped 1a that is about to be wiped by the blade rubber 15. Thus, the surface to be wiped 1a is quickly cleaned. Further, the blade rubber 15 is prevented from sliding on the surface to be wiped 1a when the surface 1a is dry. This extends the life of the blade rubber 15.

(6) The nozzle mechanism 41 has the check valve 43. When the washer liquid W is being fed under pressure, the check valve 43 permits the washer liquid W to be sent from the inlet passage 42a to the spray holes 47. When the supply of the washer liquid W is stopped, the check valve 43 blocks the flow of the washer liquid W from the inlet passage 42a to the spray holes 47. This prevents the washer liquid remaining in the vehicle-side hose 40 from leaking from the spray holes 47. That is, leaked washer liquid W is prevented from staying on to the surface to be wiped 1a.

For example, if the vehicle wiper device 11 performs wiping without supplying the washer liquid W, the liquid W is likely to leak. Even in this case, the check valve 43 of the present embodiment reliably prevents leakage of liquid onto the surface to be wiped 1a.

(7) The check valve 43 includes the valve body 45, which opens and closes the inlet passage 42a, and the coil spring 46, which urges the valve body 45 in a direction to close the inlet passage 42a. This simplifies the structure of the check valve 43, and thus facilitates the assembly.

(8) The cover mechanism 16 covers the lever assembly 14, which has the secondary levers 22 connected to the primary lever 21 in a hierarchical structure. This improves the appearance of the wiper blade 13. Further, the cover mechanism 16 suppresses the generation of wind roar of relative wind passing through apertures in the lever assembly 14.

(9) The cover mechanism 16 has the insertion hole 31e, which corresponds to the connecting pipe 42. Thus, the cover mechanism 16 is capable of covering the connecting pipe 42 by inserting the vehicle-side hose 40 into the insertion hole 31e.

(10) The fin portions 31d, 32b are provided at a front edge of the cover mechanism 16 with respect to the vehicle, and the nozzle mechanism 41 is located at a rear end of the cover mechanism 16 with respect to the vehicle. The inclination of the fin portion 31d is limited in such a manner as to obtain a proper pressing force to urge the blade rubber 15 against the surface to be wiped 1a by means of vehicle relative wind. Since the nozzle mechanism 41 is located on a side opposite to the fin portion 31d in the cover mechanism 16, a practical arrangement of the nozzle mechanism 41 is possible. For example, the cover mechanism 16 is prevented from being excessively enlarged.

(11) The nozzle mechanism 41 has the spray holes 47, which spray the washer liquid W in the longitudinal direction of the wiper blade 13. The nozzle passage, which is a passage of washer liquid in the nozzle mechanism 41, is branched from the accommodation recess 43b to each spray hole 47. The valve body 45 is located between the accommodation recess 43b and the inlet passage 42a. That is, the valve body 45 is located closer to the inlet passage 42a than to a branch portion at which the nozzle passage is branched into the spray holes 47. Thus, leakage of washer liquid from the spray holes 47 is prevented by the single valve body 45. Therefore, while enabling supply of the washer liquid W to a wide range in the longitudinal direction of the wiper blade 13, leakage of washer liquid from the spray holes 47 is prevented by a simple structure.

A second embodiment of the present invention will now be described with reference to FIGS. 7 to 13.

As shown in FIGS. 7 to 10, a nozzle attaching portion 31n is located in a center of the holder accommodating portion 31a of the center cover 31. The nozzle attaching portion 31n is located rearward in the vehicle in the center cover 31, and or a side opposite to the fin portion 31d located forward in the vehicle. A nozzle mechanism 241 of the second embodiment is attached to the nozzle attaching portion 31n. In the wiper blade 13 of the second embodiment, the number of the nozzle mechanism 241 is one. The nozzle attaching portion 31n includes a plurality of engaging pieces 31f shown in FIG. 11. The elastically deformable engaging pieces 31f detachably hold the nozzle mechanism 241.

Figure 11:
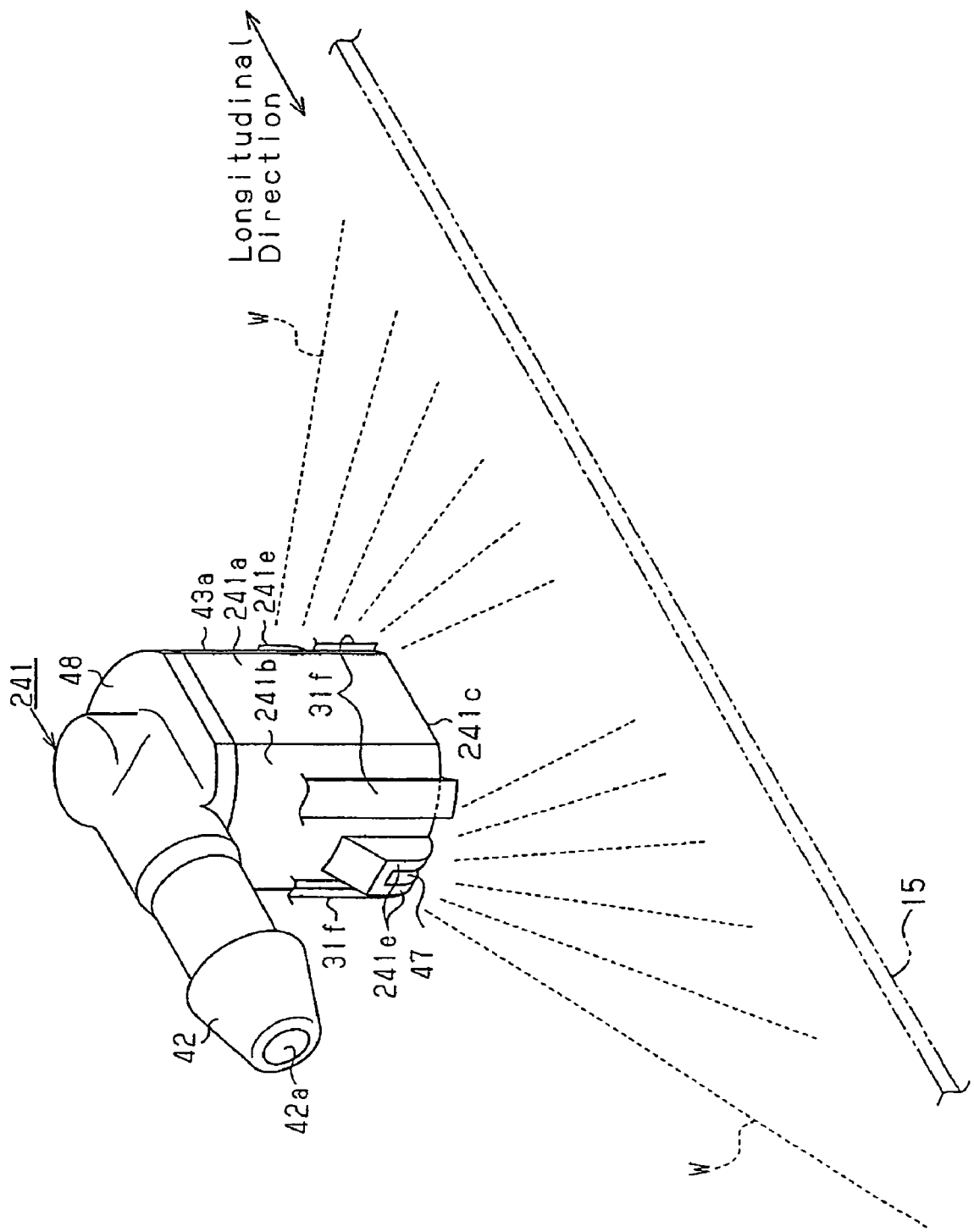
FIG. 11 is a perspective of the washer nozzle shown in FIG. 9.
Figure 12:
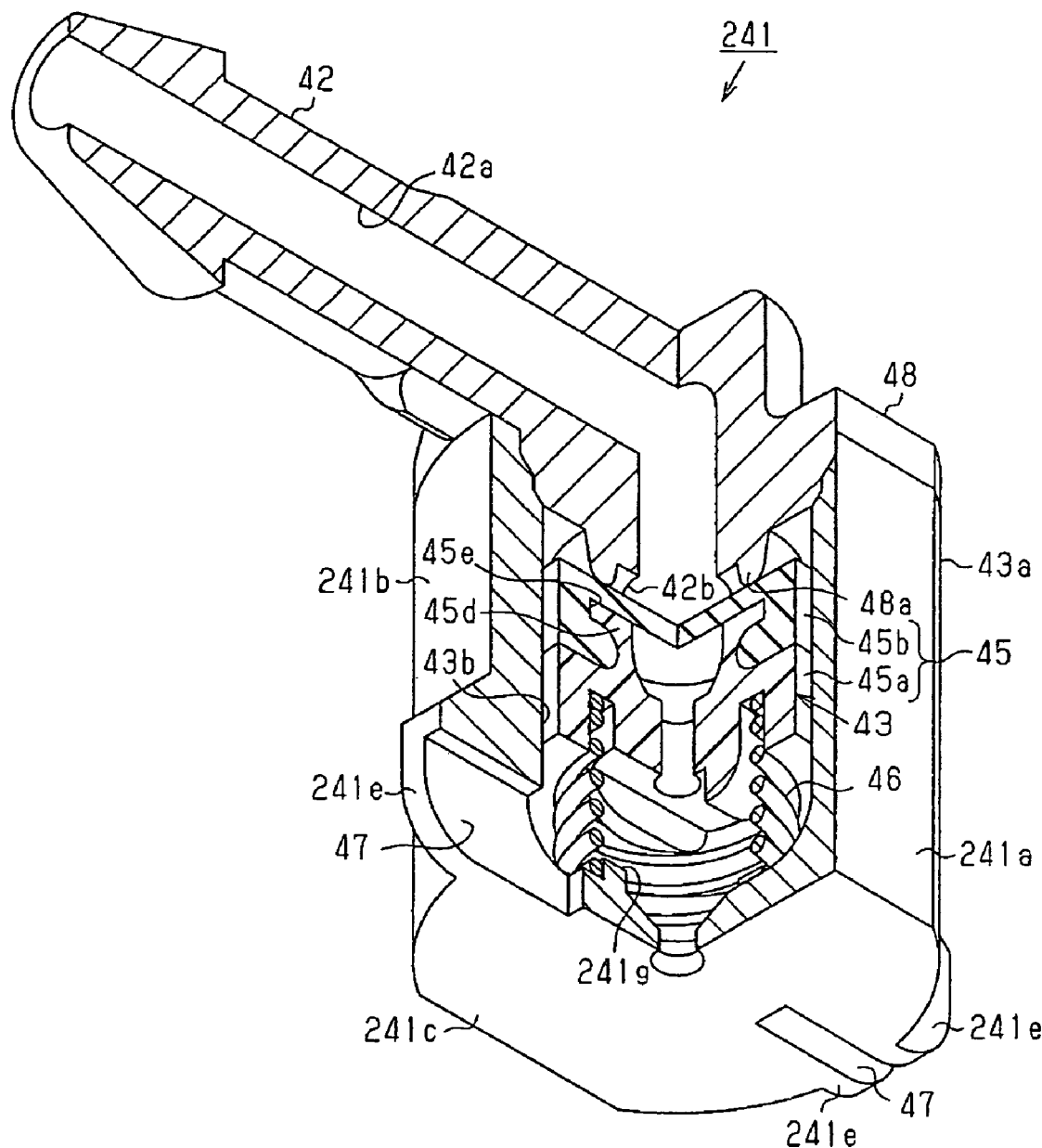
FIG. 12 is a cross-sectional perspective view of the washer nozzle shown in FIG. 11, as viewed from obliquely below.
Figure 13:
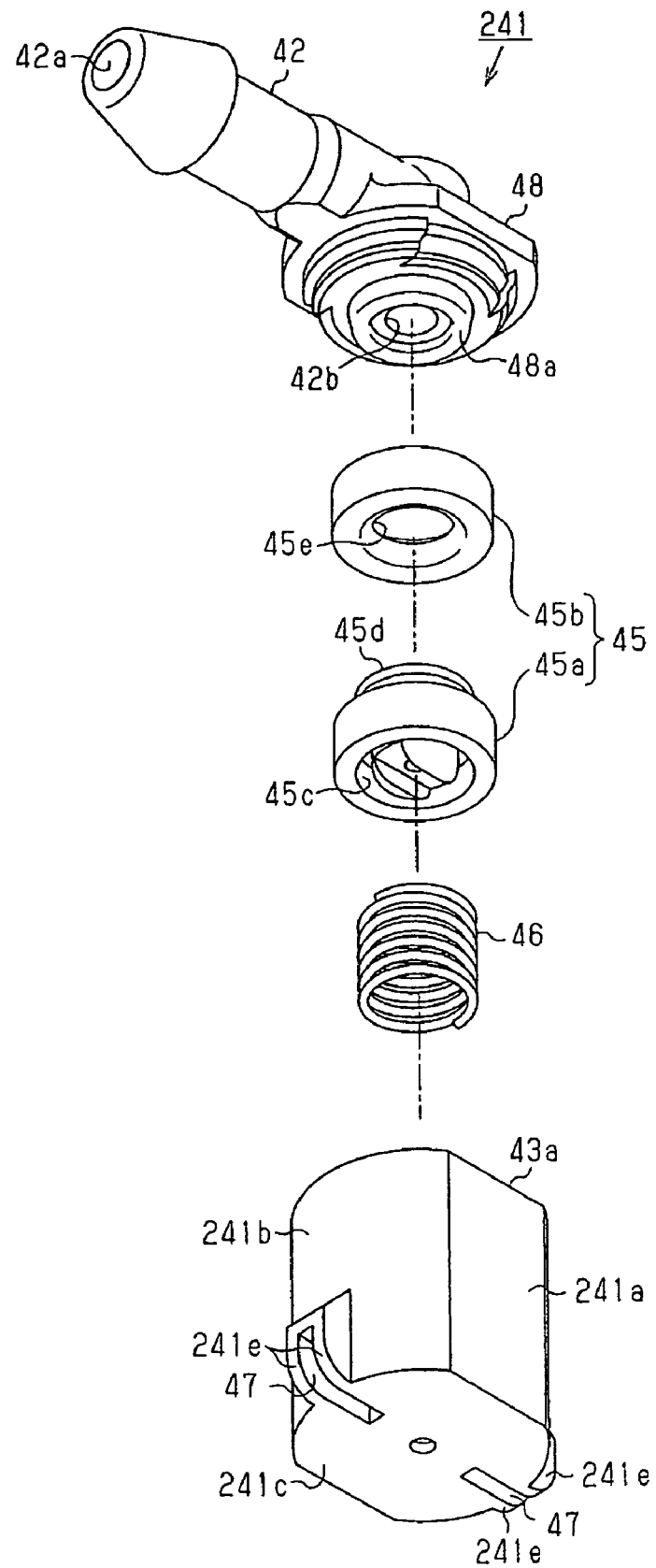
FIG. 13 is an exploded perspective view of the washer nozzle shown in FIG. 12, as viewed from obliquely below.

As shown in FIGS. 11 to 13, the casing 43a of the nozzle mechanism 241 is made of resin and shaped as a partly flattened cylinder with an end closed. Specifically, the casing 43a includes a pair of flat portions 241a parallel to each other, a pair of arcuate portions 241b, and a bottom 241c. The arcuate portions 241b connect the ends of the flat portions 241a. The bottom 241c closes one end of a tubular body formed by the flat portions 241a and the arcuate portions 241b. The casing 43a is attached to the center cover 31 such that the bottom 241c faces downward and that the planes of the flat portions 241a coincide with the longitudinal direction of the wiper blade 13, that is, the arcuate portions 241b are arranged such that the arcuate portions 241b face the ends of the wiper blade 13.

The casing 43a includes a pair of spray holes 47. Each spray hole 47 is located in a center of a corner between one of the arcuate portions 241b and the bottom 241c. Each spray hole 47 is formed as a slit extending in the longitudinal direction of the wiper blade 13, and sprays washer liquid W in a dispersing manner such that the sprayed liquid W has a directivity in the longitudinal direction. The casing 43a has two pairs of guide walls 241e, each of which sandwiches one of the spray holes 47. The guide walls 241e guide the washer liquid W such that the liquid W is dispersed with a directivity in the longitudinal direction of the wiper blade 13.

As shown in FIGS. 12 and 13, the proximal portion 45a of the valve body 45 has a fitting projection 45d, and the sealing portion 45b has a fitting recess 45e into which the fitting projection 45d is fitted. By fitting the fitting projection 45d into the fitting recess 45e, the sealing portion 45b is attached to the proximal portion 45a of the valve body 45.

The bottom 241c of the casing 43a has an attaching portion 241g formed in the accommodation recess 43b. The proximal end of the coil spring 46 is fitted about the attaching portion 241g. While supporting the valve body 45, the coil spring 46 presses valve body 45 toward the opening of the casing 43a, that is, toward the lid body 48.

The lid body 48 closes the opening of the casing 43a. The lid body 48 includes a connecting pipe 42 that projects in the longitudinal direction of the wiper blade 13. As shown in FIG. 12, the opening 48b of the inlet passage 42a is located in a center of the lower surface of the lid body 48.

As shown in FIG. 7, the vehicle side hose 40 is accommodated in a lower portion of the wiper arm 12. The vehicle side hose 40 extends from a washer pump (not shown) that is provided in the vehicle body and functions as a pump device.

As shown in FIG. 12, the valve body 45 closes the opening 48b of the inlet passage 42a, thereby preventing washer liquid W from entering the accommodation recess 43b.

The second embodiment as described above has the same advantages as the first embodiment.

The present invention may be embodied in the following forms.

In the previous embodiments, the cover mechanism 16 is formed by three parts, or the center cover 31 and the two side covers 32. However, the cover mechanism 16 may be formed by two or less parts or by four or more parts.

Figure 14:
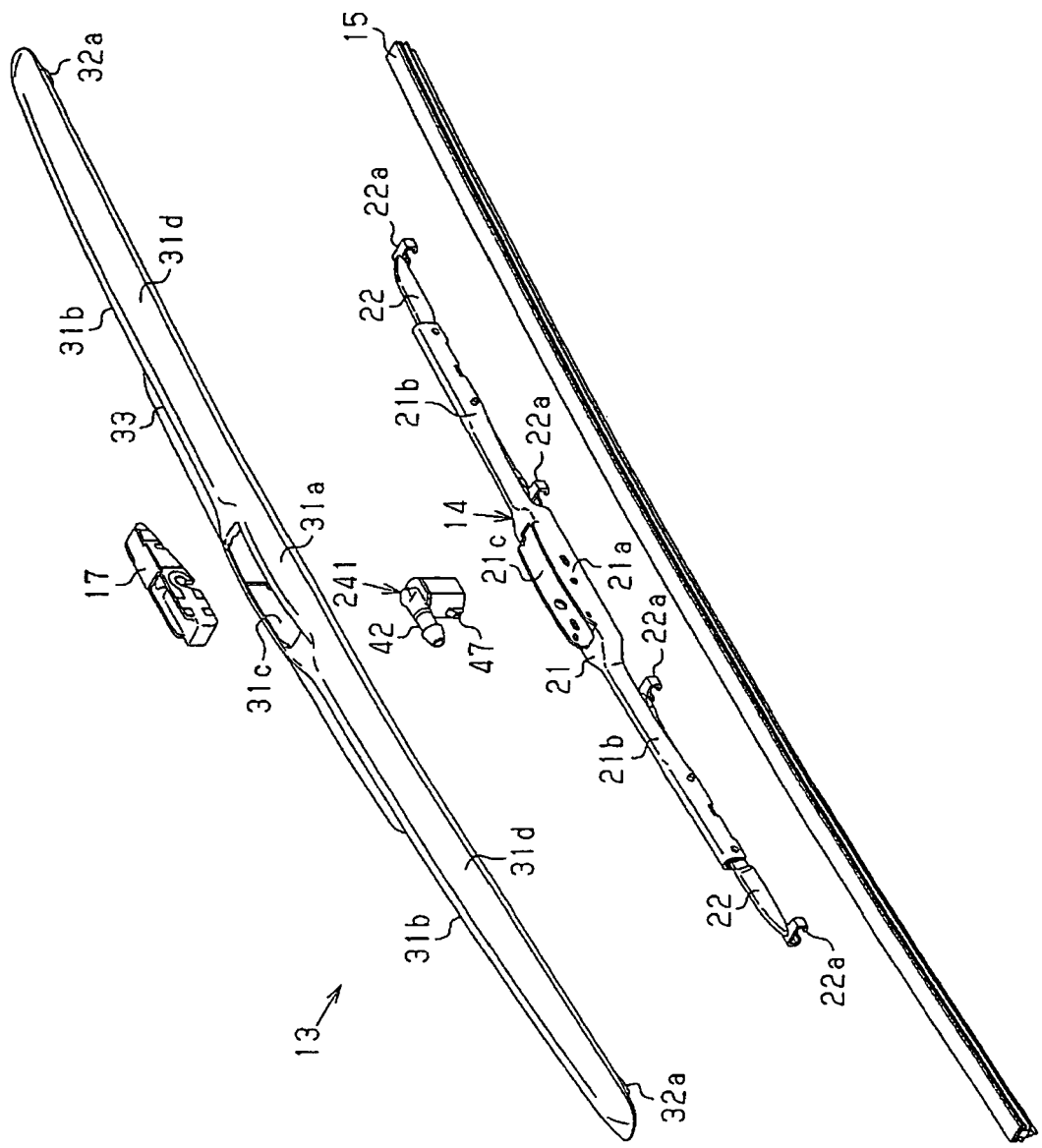
FIG. 14 is an exploded perspective view of a wiper blade according to a modified embodiment of the present invention.

As shown in FIG. 14, a cover mechanism 33 formed by a single part may be employed. The cover mechanism 33 has a shape in which the center cover 31 and the two side covers 32 are integrated. The cover mechanism 33 has a holder accommodating portion 31a in a center and an arm accommodating portion 31b at each end of the holder accommodating portion 31a in the longitudinal direction.

In the above embodiments, the fin portions 31d, 32b may be omitted from the cover mechanism 16.

In the above embodiment, the position of the nozzle mechanism 241 is not limited to the center of the cover mechanism 16, that is, the center of the center cover 31, but may be changed in accordance with the size of the space in which the wiper device 11 is provided and the desired range of the spraying.

In the second embodiment, the wiper blade 13 may have more than one nozzle mechanism 241, but may have two or more nozzle mechanisms 241.

Figure 15:
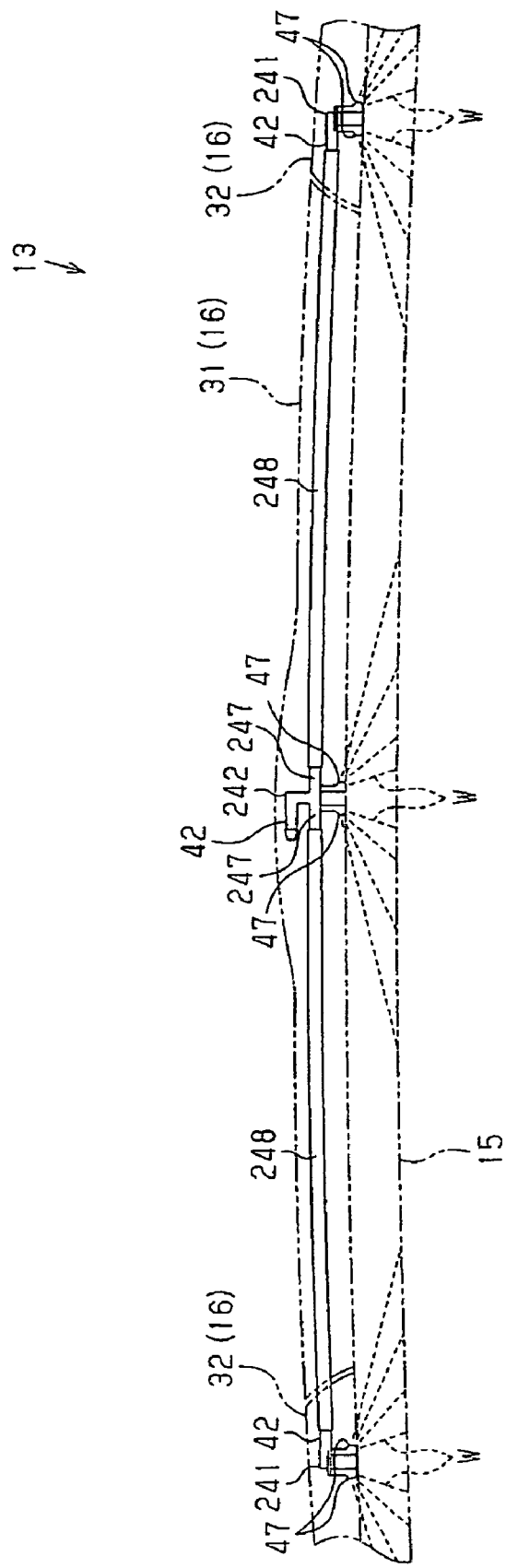
FIG. 15 is a diagrammatic view illustrating a wiper blade according to a further modified embodiment.

For example, a wiper blade 13 shown in FIG. 15 has a pair of nozzle mechanism 241 each at one end. The nozzle mechanism 241 at the ends are referred to as first the nozzle mechanisms 241. The wiper blade 13 further includes a second nozzle mechanism 242 in a center.

Each nozzle mechanism 241 is accommodated in the proximal end of the corresponding side cover 32. Each side cover 32 accommodates the entirety of the corresponding nozzle mechanism 241. That is, each side cover 32 also accommodates the connecting pipe 42 extending from the corresponding nozzle mechanism 241.

The second nozzle mechanism 242 has the same structure as that of the first the nozzle mechanisms 241, further includes a pair of coupling pipes 247. Each coupling pipe 247 branches from the connecting pipe 42 toward one end of the wiper blade 13 in the longitudinal direction. Each coupling pipe 247 of the second nozzle mechanism 242 is connected to the corresponding first nozzle mechanism 241 by a connecting tube 248. The vehicle side hose 40 is connected to the connecting pipe 42 of the second nozzle mechanism 242. Thus, the washer liquid W fed under pressure from the vehicle side hose 40 is sent to each first nozzle mechanism 241 through the second nozzle mechanism 242. In this case, since the washer liquid W is sprayed from the first the nozzle mechanisms 241 and the second nozzle mechanism 242, the washer liquid W is supplied to a wide range of the wiper blade 13 in the longitudinal direction.

Figure 16:
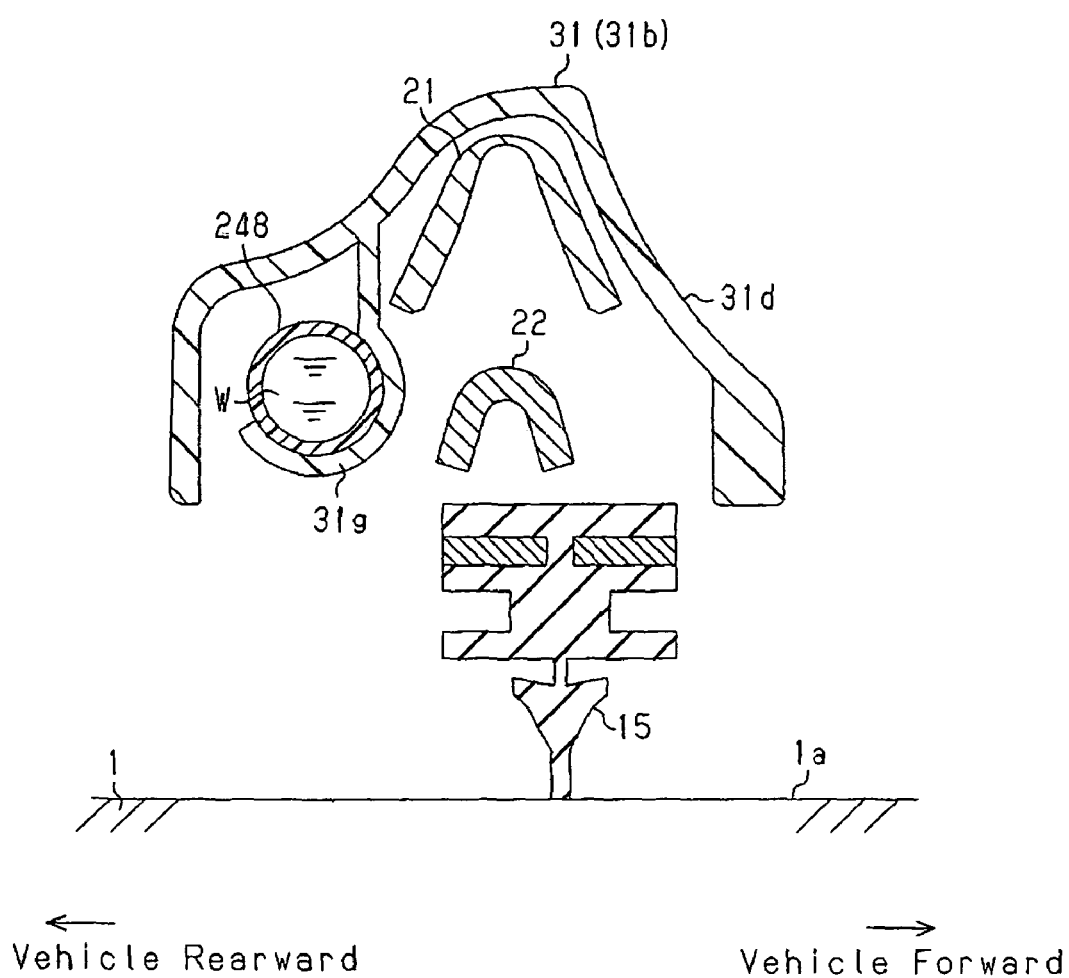
FIG. 16 is a cross-sectional view illustrating a wiper blade according to a further modified embodiment.

The connecting tubes 248 are made of an elastic material such as resin, rubber, and elastomer. As shown in FIG. 16, each connecting tube 248 is accommodated in the cover mechanism 16. Thus, the connecting tubes 248 are inconspicuous from the outside, and do not spoil the appearance of the wiper blade 13. Also, since the cover mechanism 16 protects the connecting tubes 248 from ultraviolet rays, the connecting tubes 248 are prevented from being prematurely degraded.

As shown in FIG. 16, tube holding pieces 31g for holding the connecting tubes 248 may be provided on the inner wall of the center cover 31. It is easy to fit the connecting tubes 248 to the tube holding pieces 31g, and the tube holding pieces 31g reliably hold the connecting tubes 248. Each tube holding piece 31g has a hook-shaped cross-section. Each tube holding piece 31g projects downward from the center cover 31 so that the corresponding connecting tube 248 is separated from the primary lever 21 and the secondary levers 22.

The tube holding pieces 31g prevent the lever assembly 14 from interfering with the connecting tubes 248. That is, the tube holding pieces 31g prevent the connecting tubes 248 from contacting the primary lever 21 and the secondary levers 22. The tube holding pieces 31g prevent the connecting tubes 248 from hindering the wiping operation of lever assembly 14. Further, the tube holding pieces 31g prevent the connecting tubes 248 from being caught between the primary lever 21 and the secondary levers 22 during the wiping operation. In other words, the connecting tubes 248 are prevented from being damaged.

In the previous embodiments, the nozzle mechanism 241 is attached to the cover mechanism 16. However, the nozzle mechanism 241 may be attached to a component of the wiper blade 13 other than the cover mechanism 16.

Figure 17:
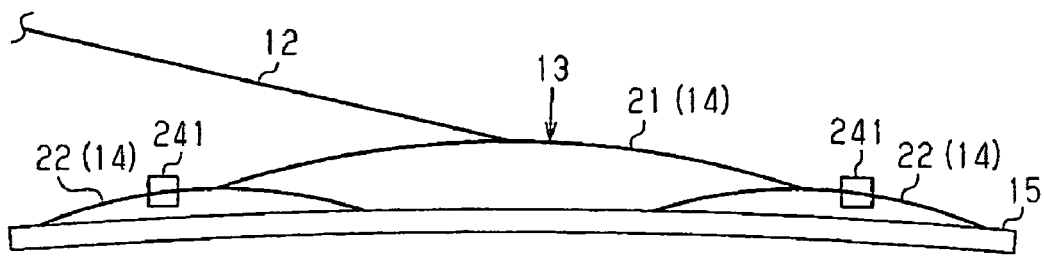
FIG. 17 is a diagrammatic view illustrating a wiper device according to a further modified embodiment.

For example, as shown in FIG. 17, the nozzle mechanisms 241 may be attached to the secondary levers 22 of the lever assembly 14. Each secondary lever 22 is rotated to conform to the curved shape of the surface to be wiped 1a. The spraying direction of washer liquid W of each nozzle mechanism 241 attached to one of the secondary lever 22 is changed in accordance with rotation of the secondary lever 22. Therefore, the spraying angle of the washer liquid W in relation to the surface to be wiped 1a is always stable when the wiper blade 13 reciprocates. Further, since the secondary levers 22 hold the blade rubber 15, the secondary levers 22 are the closes to the surface to be wiped 1a. Since the nozzle mechanisms 241 are attached to the thus configured secondary levers 22, the washer liquid W is sprayed onto the surface to be wiped 1a with the spraying angle being further stabilized. As shown in FIG. 17, in the configuration where the nozzle mechanism 241 is attached to each nozzle mechanism 241, the cover mechanism 16 may be omitted.

Figure 18:
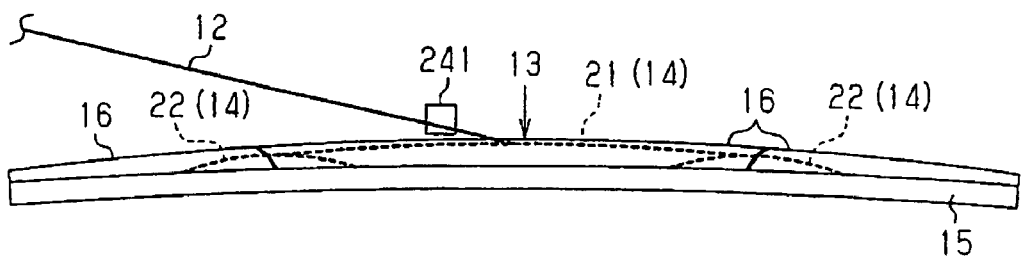
FIG. 18 is a diagrammatic view illustrating a wiper device according to a further modified embodiment.

As shown in FIG. 18, the nozzle mechanism 241 may be attached to the distal end of the wiper arm 12 instead of the wiper blade 13.

In the previous embodiments, holding member that hold the blade rubber 15 is the lever assembly 14 having three lever members (21, 22). However, the number of lever members in the holding member may be changed as necessary. The number of lever members may be one. The holding member does not need to be formed by lever members, but may be formed of packing members. A packing member has a coupling portion to be connected to the wiper arm 12. The rigidity of the packing member is increased so as to hold the rubber blade rubber 15.

In the first embodiment, the nozzle mechanism 41 is integrally provided with the attachment plate 18, which is attached to the primary lever 21. The attachment plate 18 regulates airflow. However, the nozzle mechanism 41 may be attached to an attachment member that is attached to the lever assembly 14 or the cover mechanism 16 for a purpose other than regulating airflow or only for attaching a washer nozzle.

In the previous embodiments, the check valve 43 includes the valve body 45 and the coil spring 46. However, the configuration of the check valve 43 may be changed as necessary. For example, an urging member other than the coil spring 46 may be used.

For example, in the cover mechanism 16, the passages of washer liquid W may be extended from the nozzle mechanism 41 to the side covers 32 by using connecting hoses so that the washer liquid W can be sprayed from the side covers 32.

Figure 19:
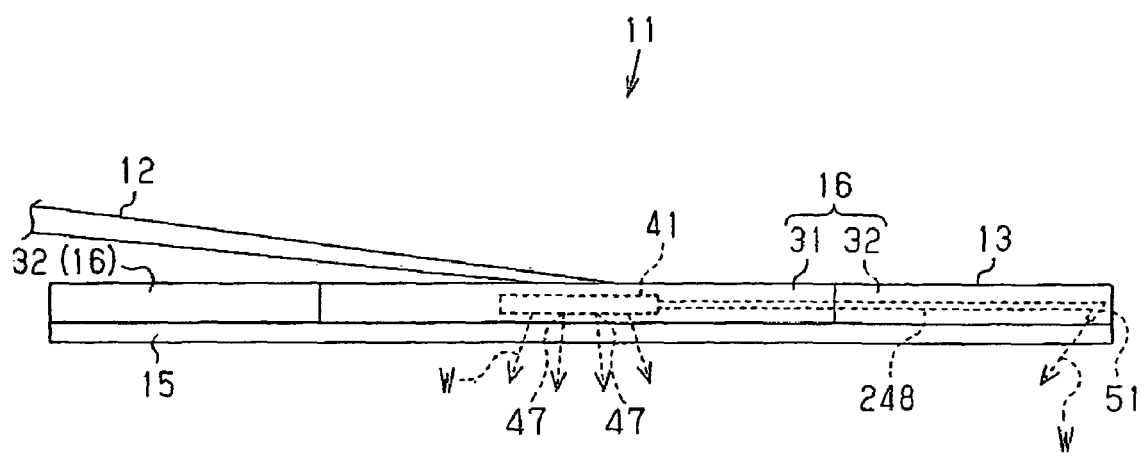
FIG. 19 is a diagrammatic view illustrating a wiper blade according to a further modified embodiment.

As shown in FIG. 19, a distal nozzle 51 may be provided in the distal end of the wiper blade 13. Washer liquid W in the nozzle mechanism 41 is supplied to the distal nozzle 51 through the connecting tube 248 functioning as a connecting hose. The spraying direction of the washer liquid W from the distal nozzle 51 may be inclined toward the center of the wiper blade 13. This suppresses spraying of the washer liquid W from the distal nozzle 51 to areas outside of the area to be wiped by the wiper blade 13.

Figure 20:
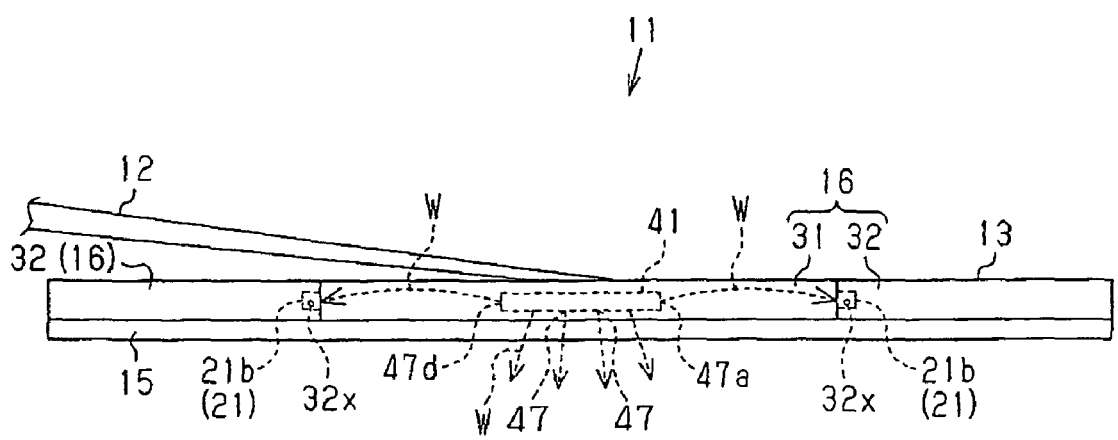
FIG. 20 is a diagrammatic view illustrating a wiper blade according to a further modified embodiment.

As shown in FIG. 20, the nozzle mechanism 41 may have spray holes 47a for spraying washer liquid W in the vicinity of the coupler pins 32x between the side covers 32 and the primary lever 21. In this case, the coupler pins 32x serving as rotary shafts of the side covers 32 are prevented from being frozen. Even if the coupler pins 32x are frozen, they can be defrosted by washer liquid W. This permits the side covers 32 to smoothly rotate. Since washer liquid W generally contains alcohol, freezing is effectively prevented, and defrosting is effectively promoted.

Although the multiple embodiments have been described herein, it will be clear to those skilled in the art that the present invention may be embodied in different specific forms without departing from the spirit of the invention. The invention is not to be limited to the details given herein, but may be modified within the scope and equivalence of the appended claims.

The invention claimed is:

1. A wiper blade attachable to a wiper arm, the wiper arm capable of moving in a direction from a standby position and being provided with a supply passage of washer liquid, the wiper blade comprising:

a blade rubber for wiping a surface to be wiped;

a lever coupled to a wiper arm, the lever holding the blade rubber;

a cover having an opening facing the blade rubber, the cover accommodates at least a part of the lever from the opening;

a nozzle mechanism having a connecting portion connected to the supply passage and a nozzle portion, wherein the nozzle portion receives washer liquid that has been sent from the supply passage under pressure and passed the connecting portion, and supplies the washer liquid to the surface to be wiped; and an attachment member integrated with the nozzle mechanism, wherein, in a state where the cover accommodates the nozzle mechanism, the attachment member is attached to the lever or the cover, wherein the lever includes a holder portion that rotatably connects the lever to the wiper arm;

wherein the cover includes a holder accommodating portion for accommodating the holder portion, and wherein the nozzle mechanism is located between the holder portion and the holder accommodating portion, wherein, when the wiper blade starts wiping the surface to be wiped from the standby position, the nozzle mechanism is located on a leading side in the moving direction of the wiper blade with respect to the blade rubber.

2. The wiper blade according to claim 1, wherein the attachment member is detachably attached to the lever or the cover.

3. The wiper blade according to claim 1, wherein the surface to be wiped is provided on a vehicle, and wherein the attachment member includes a regulating member for regulating airflow generated in the cover when the vehicle is traveling.

4. The wiper blade according to claim 1, wherein the nozzle mechanism includes a valve that, when the washer liquid is being fed under pressure, permits the washer liquid to flow from the connecting portion to the nozzle portion, and wherein, when the supply of the washer liquid is stopped, the valve blocks the flow of the washer liquid from the connecting portion to the nozzle portion.

5. The wiper blade according to claim 4, wherein the valve includes a valve body and an urging member that urges the valve body in a direction to close the valve.

6. The wiper blade according to claim 1, wherein the cover includes a fixed cover fixed to the lever, a movable cover that is rotatable relative to the fixed cover, and a rotary shaft for rotatably supporting the movable cover on the lever or on the fixed cover, and wherein the nozzle mechanism includes a supply hole for supplying the washer liquid to a portion in the vicinity of the rotary shaft.

7. The wiper blade according to claim 1, wherein the lever includes a primary lever coupled to a distal end of the wiper arm, and a plurality of secondary levers coupled to the primary lever to form a hierarchical structure, and wherein the cover accommodates the primary lever and the plurality of secondary levers.

8. The wiper blade according to claim 7, wherein the nozzle mechanism is attached to at least one of the primary lever and the secondary lever.

9. The wiper blade according to claim 1, wherein the cover accommodates the supply passage.

10. The wiper blade according to claim 1, wherein the nozzle mechanism includes a plurality of spray holes that spray the washer liquid in a longitudinal direction of the wiper blade.

11. The wiper blade according to claim 10, wherein the nozzle mechanism includes a branch portion between the connecting portion and the spray holes, the branch portion distributing washer liquid, and wherein a valve body is located between the connecting portion and the branch portion.

* * * * *